July 7, 1970 T. W. O'KEEFFE 3,519,873
MULTIPLE BEAM ELECTRON SOURCE FOR PATTERN GENERATION
Filed Dec. 18, 1968

WITNESSES

INVENTOR
Terence W. O'Keeffe
BY
ATTORNEY 3,519,873
MULTIPLE BEAM ELECTRON SOURCE FOR
PATTERN GENERATION
Terence W. O'Keeffe, Pittsburgh, Pa., assignor to Westinghouse Electric Corporation, Pittsburgh, Pa., a corporation of Pennsylvania
Filed Dec. 18, 1968, Ser. No. 784,551
Int. Cl. H01j 29/50, 31/49
U.S. Cl. 315—10
14 Claims

ABSTRACT OF THE DISCLOSURE

The invention is a multiple electron beam source consisting of an array of electron sources which, under the influence of scan coils, functions to simultaneously expose identical patterns on a target workpiece.

GOVERNMENT CONTRACT

The invention herein described was made in the course of or under a contract with U.S. Air Force.

BACKGROUND OF THE INVENTION

Field of the invention

This invention is concerned with the simultaneous exposure of multiple identical patterns on a target.

Description of the prior art

The use of optical techniques and scanning electron beam methods for exposing complex patterns such as integrated circuits and semiconductor devices have not provided the required pattern resolution and speed of exposure desired.

The utilization of optical techniques requiring mechanical contact between a mask and the target frequently results in damage to both the target surface and the mask. In addition, the use of light for exposure of the resist restricts the ultimate resolution, circuit density, and circuit complexity which may be achieved.

High resolution can be obtained by the use of electron beams such as provided by a scanning electron microscope (SEM). In a scanning system the individual target areas are exposed sequentially. Since the resolution diminishes as the deflection angle increases, the whole target cannot be exposed in a single exposure period, thus requiring the use of a step and repeat cycle.

SUMMARY

The use of an image intensifier tube for complex pattern fabrication by means of direct electron bombardment is described in detail in the copending application Ser. No. 753,373, filed Aug. 19, 1968 by T. W. O'Keeffe and R. M. Handy entitled "Pattern Definition in Resist Layers by Application of an Electron Image." An image intensifier consists basically of a photoemissive cathode separated by a vacuum gap from a target anode.

The image tube concept provides large area projected images of high resolution, allowing complex integrated circuits of very small component sizes to be fabricated on large diameter target workpieces.

It is shown in the above noted copending application that the electron optics system of the image tube will accurately reproduce images of less than 1 micron dimension provided patterns of this size are present at the photocathode surface. The problem then is to produce a suitable pattern at the photocathode emitting surface with the required resolution over a suitably large area. It is this pattern which determines the geometry of the pattern array to be fabricated on the target.

It has been shown that micron resolution capabilities of the present image tube extend over an area of at least 1 inch diameter, limited only by the uniformity of the electric and magnetic fields used to produce the focusing action within the tube. If the full potential of the image tube concept is to be realized, the pattern defined in the cathode must show micron resolution over suitably large areas, thereby eliminating step and repeat sequences in the target exposure.

It is the object of this invention to utilize an image tube cathode comprising multiple electron beam sources which can be converted into a pattern of virtually arbitrary complexity with excellent resolution and area capability.

It is a further object of the invention to fabricate patterns without step and repeat sequences.

DESCRIPTION OF THE PREFERRED EMBODIMENT

Figure 1:
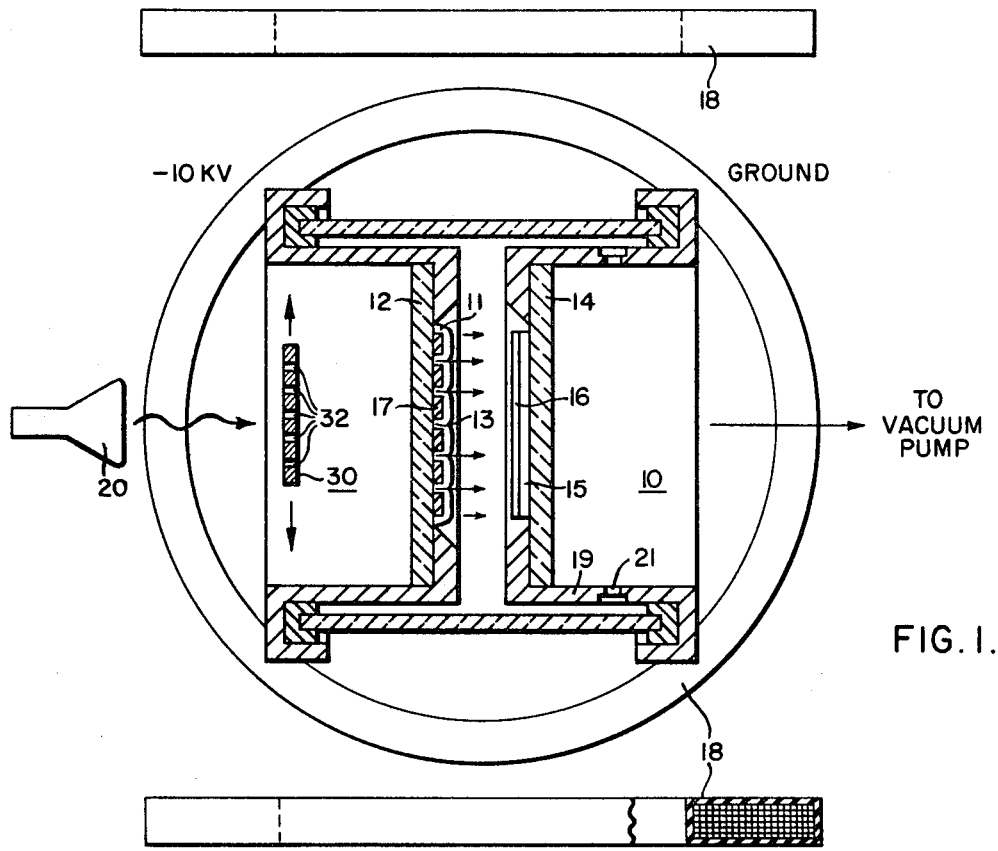
FIG. 1 is a cross-sectional view of an embodiment of apparatus in accordance with the present invention.

Referring to FIG. 1 there is shown an image tube 10 having a cathode plate 12 and a target plate 14 that are essentially planar and parallel. On the cathode plate 12 is a mask 17 defining a plurality of electron emitting sources 13 on a photocathode 11 so that incident light from a light source 20, typically an ultraviolet light source, illuminating the entire photocathode 11 produces electron response only from the electron sources 13. The target plate 14 contains one or more workpieces 15 that have a layer of an organic etch resist material 16 thereon.

The cathode plate 12 includes a radiation transmissive support such as one of quartz that forms part of the enclosure in the space between the cathode and the target. The target plate 14 is mounted on a means such as a frame 19 that permits the evacuation through port 21 of the space between the cathode and the target.

The image tube operation and construction is described in more detail in copending application Ser. No. 753,373, filed Aug. 19, 1968 by T. W. O'Keeffe and R. M. Handy, entitled, "Pattern Definition in Resist Layers by Application of an Electron Image."

Figure 2:
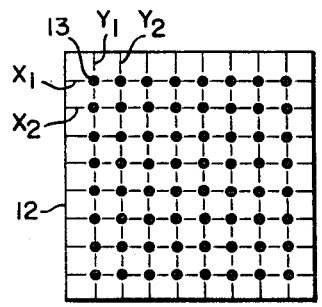
FIG. 2 is a detailed view of a photocathode embodying the invention.

In FIG. 2 there is illustrated the multiple beam electron cathode 12 consisting of an array of extremely fine individual photoemissive elements 13.

The U-V masking layer 17 required to produce the array of photoemissive elements 13 can be formed by one of several techniques which is employed prior to inserting the cathode into the image tube. The techniques available include among others the intersecting line technique and the scanning electron microscope technique for cathode pattern fabrication.

The former technique involves the exposure of a blank cathode coated with a U-V masking layer and an electron sensitive resist such as aluminum in which the blank cathode is stepped under the beam of a line exposure bombardment apparatus designed to provide an electron beam of suitable dimensions, typically 1 micron wide by 1.5 inches long. A pattern of equally spaced line exposures $X_1$, $X_2$, etc. are produced. The cathode is then rotated 90° and the line exposure sequence is repeated resulting in the formation of line exposures $Y_1$, $Y_2$, etc. The exposing electron beam intensity is such that a mask pattern is produced wherein unmasked photo-emissive elements are developed only at the areas subjected to double exposure, namely elements 13. The intersection of perpendicular electron beam images each of 1 micron inch width establishes electron emitting sources measuring 1 micron by 1 micron. Assuming there are one hundred X-line exposures and one hundred Y-line exposures, a total of 10,000 electron emitting sources will be established.

It may be desirable to apply a protective film of a material such as $SiO_2$ over the cathode mask 17.

The presence of a cathode providing an array of 10,000 electron emitting sources in the image tube 10 permits the exposure of up to 10,000 identical patterns on the target-anode 14.

The intersecting line and beam scan techniques represent two of several cathode exposure techniques. A more detailed description of the various techniques is presented in the copending application, Ser. No. 784,801 of T. W. O'Keeffe and J. R. Morris, filed Dec. 18, 1968 and assigned to the assignees of the present invention.

Coils 18 positioned about the image tube 10 provide control of the target exposure by the electron beams generated by the array of electron sources of cathode 12. When a pattern is to be exposed by the point sources of FIG. 1 each electron beam is deflected identically both in direction and magnitude thus permitting the exposure of 10,000 identical patterns of arbitrary complexity on the target plate 14. It is apparent that the excitation signals applied to the coils 18 can be computer controlled thus rendering the pattern exposure operation totally automatic.

The ability to fabricate significant numbers of patterns of arbitrary complexity simultaneously utilizing multiple high resolution electron beam sources eliminates the requirement of step and repeat sequences generally required to expose a total pattern by scan techniques and thus reduces the time required to expose the target plate.

A prime application of the multiple electron beam photocathode is in the fabrication of cathode plates which are subsequently utilized as cathode elements for directly exposing blank target plates. The multiple electron beam source under the control of scan coils can function to fabricate multiple pattern target plates directly, if the requirement is for a small quantity of plate exposures, or can be utilized to expose a cathode plate which in turn serves as a master cathode plate available for exposing large quantities of target plates with the identical multiple circuit patterns.

The multiple electron beam photocathode is especially applicable in the fabricaiton of integrated circuits to be exposed on the target plate does not consist of a single large pattern but rather an array of similar unit cells, each of which represents a complete circuit. If the final pattern is to be a composite of several individual patterns, the pattern cannot be exposed in a single scan and a set of master cathodes must be fabricated, the combination of which represents the total pattern. This set of patterns must be accurately matched so that the individual images produced on a target plate can be precisely registered one with another. Inasmuch as each of the individual master cathodes forming the set are fabricated by the controlled scanning of the same multiple electron beam cathode, any slight irregularities in position of the individual circuits in a master cathode resulting from inherent imperfection in the positions of the multiple electron beam sources would be identically reflected in all the master cathodes of the set thus eliminating misalignment between master cathodes and insuring precise pattern registration.

Figure 3:
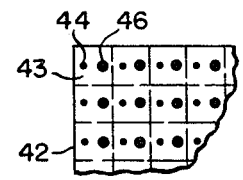
FIG. 3 is a detailed partial view of a second photocathode embodiment of the invention.

Typical integrated circuit mask patterns do not, in general consist of defined areas of the same width; for example, emitter electrodes of transistors are smaller in area than the base electrodes. Therefore it is inefficient to scan larger circuit areas with a small diameter beam. The multiple electron beam cathode can be modified as illustrated in FIG. 3 to accommodate electron beam sources of more than one cross-sectional area. The cathode 42 consists of a plurality of elemental areas 43 each area including an identical array of electron beam sources 44 of relatively small cross-sectional area and electron beam sources 46 of larger cross-sectional area. The electron source of smallest area can be formed by the crossed line technique and the electron sources of larger area formed by the scanning technique.

The positioning of a suitable electron source selector or mask 30 having a plurality of apertures 32 between the light source 20 of FIG. 1 and the cathode would permit the controlled selection of either the large or small electron beam source for exposing the target plate 14.

It is noted that a number of electron beam sources, other than point sources, of various geometric sizes and shapes can be included in each elemental area.

In the event the electron sources included in each elemental area are sufficient to expose a pattern without scanning, the target coils 18 can be utilized to position the electron beams corresponding to selected electron sources for direct exposure of the target workpiece.

What I claim is:

1. A device for defining high resolution patterns for exposure on an electron sensitive anode workpiece comprising, a multiple electron beam photoemissive source comprised of a plurality of elemental areas, each area comprised of a substantially identical array of electron emitting sources, and a radiation excitation source for exciting said electron emitting sources.

2. A device as claimed in claim 1 wherein each array is comprised of a plurality of electron sources of various geometric sizes and shapes, each electron source, when excited by said radiation source, emitting a beam of electrons corresponding in cross-section to the cross-section of the electron source.

3. A device for defining high resolution patterns for exposure on an electron sensitive anode workpiece comprising, a multiple electron beam photoemissive source, said photoemissive source comprising a plurality of substantially identical patterns each forming an electron emitting source, and a radiation excitation source for exciting said photoemissive source, said photoemissive source exposing said anode workpiece with said patterns in response to excitement by said radiation source.

4. A device for defining high resolution patterns for exposure on an electron sensitive anode workpiece comprising, a multiple electron beam photoemissive source, a radiation excitation source for exciting said photoemissive source, and means to move the multiple electron beams of said photoemissive source to draw an array of substantially identical patterns on said anode workpiece.

5. A device as claimed in claim 4 wherein said photoemissive source is comprised of multiple electron beam emitting point sources, each electron emitting source emitting an electron beam upon exposure by said radiation source.

6. A device for defining high resolution patterns for exposure on an electron sensitive anode workpiece comprising, a multiple electron beam photoemissive source, a radiation excitation source of exciting said photoemissive source, and means for positioning said electron beams for direct exposure of said workpiece.

7. In a system for fabricating high resolution patterns, apparatus for exposing a workpiece with a pattern of arbitrary complexity, said apparatus comprising, an image tube, a multiple electron beam photoemissive source comprising a plurality of electron emitting sources, said photoemissive source functioning as a cathode in said image tube, said workpiece being positioned as an anode element in said image tube for exposure by the multiple electron beams emitted by said photoemissive source, and means for directing radiation energy upon said cathode photoemissive source to excite the multiple electron beam emitting sources.

8. In a system as claimed in claim 7 including means for positioning said multiple electron beams for exposure of said workpiece.

9. In a system as claimed in claim 7 including means for scanning said multiple electron beams to draw a plurality of identical patterns on said workpiece.

10. In a system as claimed in claim 7 including means for selecting the electron emitting sources for exposing said workpiece.

11. A method for defining a plurality of high resolution patterns on a workpiece comprising the steps of, generating a plurality of electron beams from a multiple electron beam source, exposing said workpiece with said multiple electron beams, and scanning said electron beams to produce an array of substantially identical patterns on said workpiece, said patterns corresponding in number to the number of electron beams impinging on said workpiece.

12. A method as claimed in claim 11, wherein said multiple electron beams source comprises an array of electron beam point sources.

13. A method as claimed in claim 12 including, selecting the electron beam point sources for exposing said workpiece.

14. A method for defining a plurality of high resolution patterns on a workpiece comprising steps of, generating a plurality of electron beam arrays, each array comprising a substantially identical electron beam pattern, and exposing said workpiece with said plurality of electron beam arrays to produce a plurality of substantially identical patterns on said workpiece.

References Cited

UNITED STATES PATENTS

| | | | |
|---|---|---|---|
| 2,871,385 | 1/1959 | Roberts | 315—10 X |
| 3,270,233 | 8/1966 | Dietrich | 313—69 |

RODNEY D. BENNETT, JR., Primary Examiner

T. H. TUBBESING, Assistant Examiner

U.S. Cl. X.R.

313—65, 66, 69; 315—13